United States Patent [19]

Murota et al.

[11] 4,073,361
[45] Feb. 14, 1978

[54] MUFFLER FOR MOTOR VEHICLES

[75] Inventors: Kozo Murota, Isezaki; Rempei Matsumoto, Ohta; Toru Yasuma, Ohta; Mamoru Morinaga, Ohta; Shigeo Tajima, Ohta; Masayuki Nakamura, Ohta; Akira Sakaguchi, Ohta, all of Japan

[73] Assignee: Fuji Jukogyo Kabushiki Kaisha, Tokyo, Japan

[21] Appl. No.: 633,916

[22] Filed: Nov. 20, 1975

[30] Foreign Application Priority Data

Nov. 30, 1974 Japan ................... 49-146160[U]

[51] Int. Cl.² .......................... F01N 1/08; F01N 7/16; F01N 1/10
[52] U.S. Cl. ............................ 181/228; 181/256; 181/238; 181/269; 181/282
[58] Field of Search ................ 181/57, 50, 53, 62, 181/61, 72

[56] References Cited

U.S. PATENT DOCUMENTS

| 2,995,199 | 8/1961 | Myers | 181/72 |
|---|---|---|---|
| 3,488,723 | 1/1970 | Veazie | 181/62 |
| 3,581,842 | 6/1971 | Hall | 181/54 |
| 3,677,365 | 7/1972 | Wright et al. | 181/62 |
| 3,687,224 | 8/1972 | Lundin | 181/61 |
| 3,901,350 | 8/1975 | Loffelhardt | 181/57 |

Primary Examiner—Stephen J. Tomsky
Attorney, Agent, or Firm—Martin A. Farber

[57] ABSTRACT

A muffler for a motor vehicle which serves as a reactor for oxidizing or re-burning unburned constituents in engine exhaust gases. The muffler comprises a heat insulated inner shell in which a chamber is provided with a silencing unit and is kept at a high temperature sufficient to oxidize the unburned constituents, an outer shell covering the heat insulated inner shell, and means for absorbing the thermal expansion of the inner shell provided in a supporting device of the inner shell. An exhaust pipe extends into the inner shell and has one end provided with a collector. The collector has a guide opening to pass engine exhaust gases into the inner shell while achieving mixing of the exhaust gases in the collector thereby to promote oxidizing reaction of the exhaust gases.

11 Claims, 6 Drawing Figures

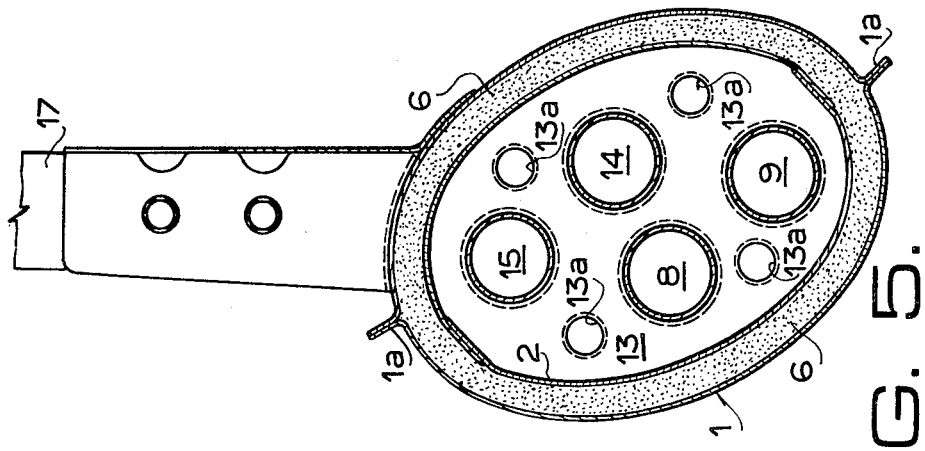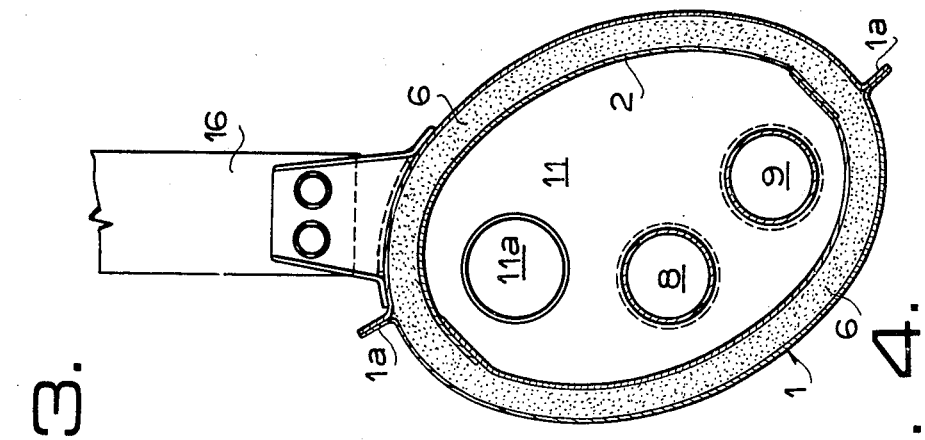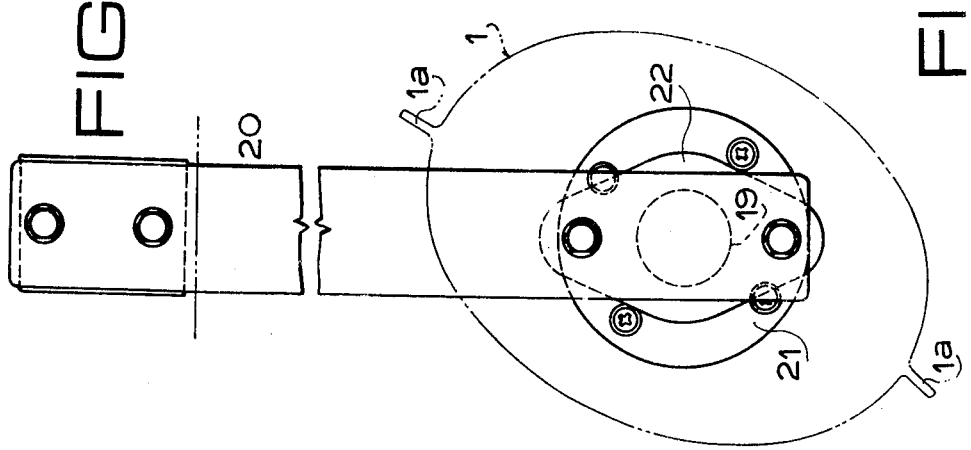

MUFFLER FOR MOTOR VEHICLES

The present invention relates to a muffler for motor vehicles.

For the purpose of reduction of amount of unburned constituents in engine exhaust gases, there has been provided a reactor connected to an exhaust passage, in which the unburned constituents such as hydrocarbons and carbon monoxide are oxidized or reburned. However, disposition of the reactor in the exhaust system entails the complication of the system.

Therefore, it is an object of the present invention to provide a muffler which serves as a reactor for effecting oxidizing reaction of unburned constituents in engine exhaust gases.

According to the present invention, the muffler comprises an inner shell in which silencing devices are provided, a heat insulating material covering the inner shell, and an outer shell covering the heat insulating material, whereby a chamber in the inner shell is kept at a high temperature sufficient to oxidize the unburned constituents. The muffler is preferably attached to the car body in such a manner that thermal expansion of each member of the muffler may be permitted for prevention of deformation and breaking of the muffler.

Accordingly, another object of the present invention is to provide a muffler having a device which may effectively absorb the thermal expansion.

Other objects, features and advantages of the present invention will be apparent from the following description taken in connection with the accompanying drawings, in which:

FIG. 3 is a view as viewed from an arrow y in FIG. 1;

FIG. 4 is a sectional view taken along IV—IV in FIG. 1;

FIG. 5 is a sectional view taken along V—V in FIG. 1; and

Figure 1:
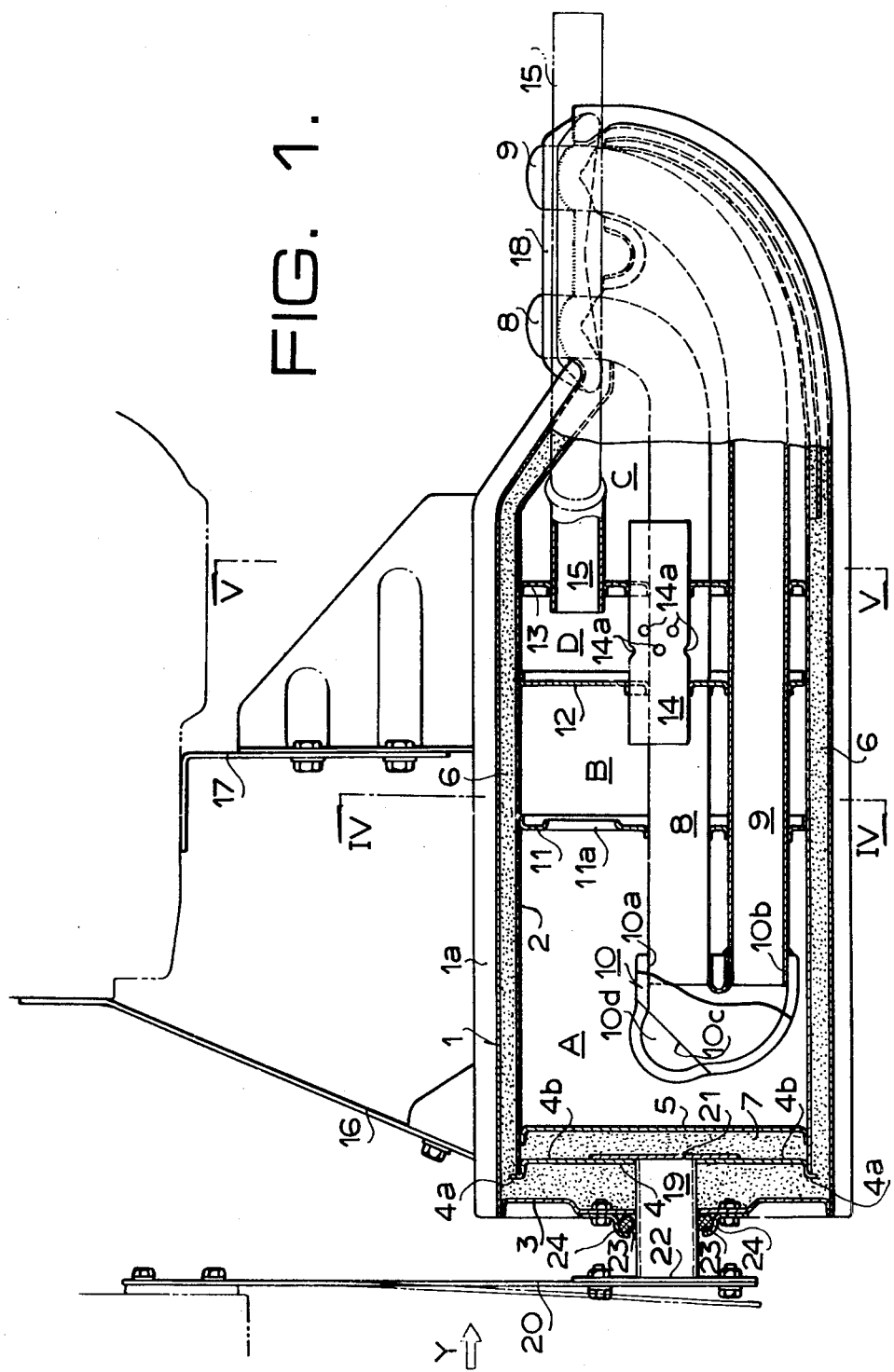
FIG. 1 is a side view of a muffler according the present invention with a part broken away.
Figure 2:
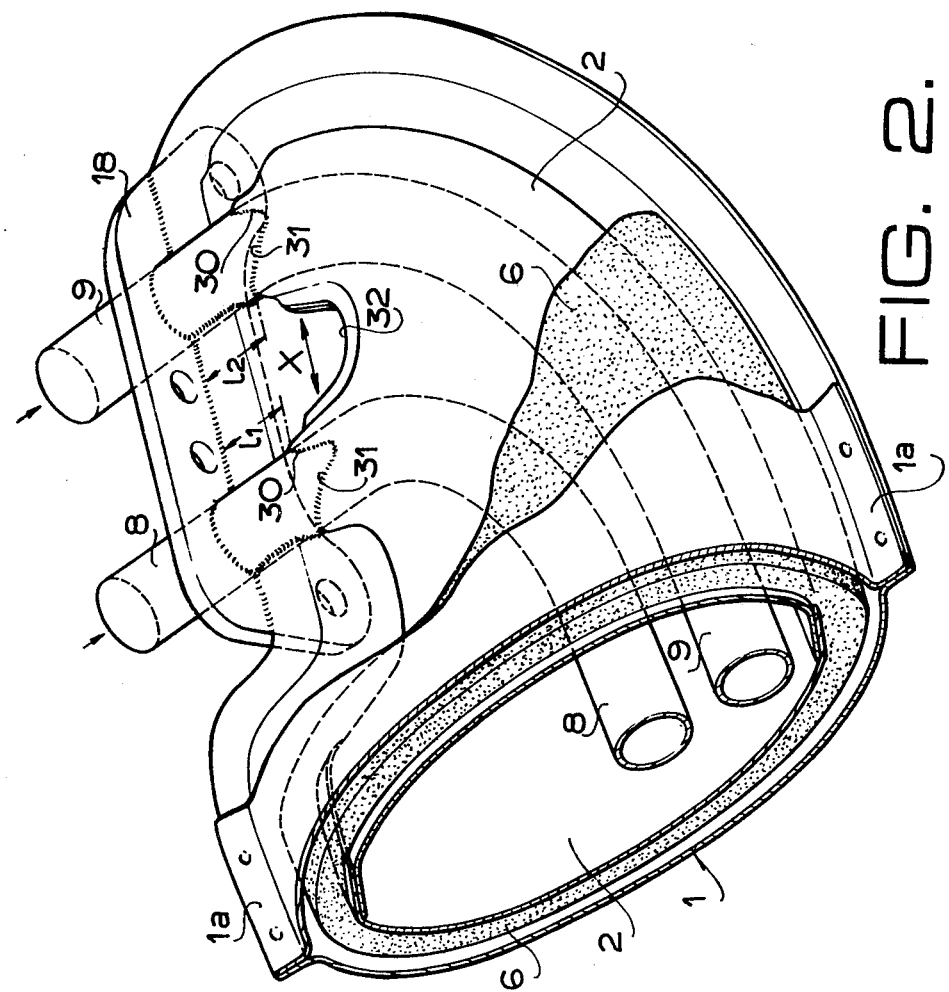
FIG. 2 is a perspective view showing a part of the muffler.

Referring now to the drawings and more particularly to FIGS. 1 and 2, a muffler according to the present invention comprises an outer shell 1 and an inner shell 2. The outer shell 1 comprises a pair of arcuated members which are welded to each other at flanges 1a to form a cylindrical structure having an elliptic cross section. One end of the the muffler body is curved perpendicular to the axis of the cylindrical body and shrunk to grip exhaust pipes 8 and 9 which are disposed in parallel. The other end of the outer shell 1 is closed by an end plate 3 secured thereto.

The inner shell 2 is formed in shape similar to the outer shell 1 and is coaxially disposed in the outer shell 1 with a desired spacing from the outer shell. One end of the inner shell 2 is also bent as the outer shell 1 and shrunk to grip the exhaust pipes 8 and 9. The other end of the inner shell 2 is closed by end plates 4 and 5. The plates 4 and 5 are spaced from each other to form a suitable spacing.

The spacings between the outer shell 1 and the inner shell 2 and between the end plate 3 and the end plate 4 are filled with a heat insulating material 6 such as metal wool so that the inner shell is perfectly coated with the heat insulating material. Thus, the chamber in the inner shell 2 may be kept at a high temperature sufficient to oxidize the unburned constituents contained in engine exhaust gases. Farther, the spacing between the end plates 4 and 5 is filled with a heat insulating material 7 so that the heat transfer to the end plate 4 may be minimized. The end plate 4 has a radially projecting rim portion 4a to prevent the displacement of the heat insulating material and has apertures 4b for allowing air to pass therethrough to absorb the pressure difference between the spaces.

Figure 6:
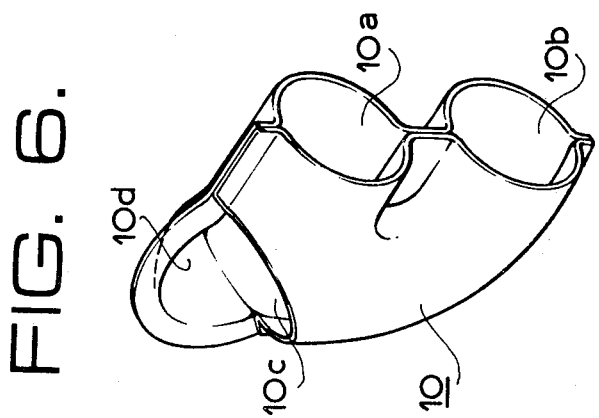
FIG. 6 is a perspective view showing a device for assembling the exhaust gases.

The exhaust pipes 8 and 9 extend into the inner shell 2 in parallel with respect to each other and terminate in the end portion of the chamber near the end plate 5. A collector 10 is secured to the ends of the exhaust pipes and serves as means for mixing the exhaust gases discharged through the exhaust pipes 8 and 9 and having different constituents thereby to facilitate oxidizing reaction of the exhaust gases. This collector 10 also serves to regulate the speed and direction of flow of the exhaust gases being discharged into the compartment A. Thus, the collector 10 serves as a primary silencing means to silence noises produced by the exhaust gases being discharged into the compartment A. The collector 10 comprises a pair of shell members welded to each other to provide openings 10a and 10b as shown in FIG. 6. One of the shell members is cut out to provide a guide opening 10c through which the exhaust gases are passed into the chamber of the inner shell 2. The guide opening 10c has an effective cross sectional area smaller than those of the exhaust pipes 8 and 9 to provide a throttling effect whereby the speed of the exhaust gases passing through the guide opening 10c is reduced and, therefore, the exhaust gases discharged from the exhaust pipes 8 and 9 are satisfactorily mixed with each other in the collector 10 to promote oxidizing reaction of the exhaust gases. In the illustrated embodiment of FIG. 1, the collector 10 is shown as being constructed to direct the exhaust gases toward the end wall of the inner shell 2. However, the collector 10 may be so arranged as to direct the exhaust gases toward the central portion of the inner shell 2. The exhaust pipe 8 is slidably disposed in the opening 10a whereas the exhaust pipe 9 is fixedly disposed in the opening 10b. Thus, difference in thermal expansions of the exhaust pipes 8 and 9 caused by the difference in lengths of the pipes does not exert any force onto the collector 10. A guide cavity 10d is continuous with the opening 10c and serves to regulate the direction of flow of the exhaust gasses passing through the openings 10c.

The chamber in the inner shell 2 is divided into four compartments by partition plates 11, 12 and 13. Therefore, the exhaust pipes 8 and 9 pass through all compartments, and the exhaust gas collector communicates with the first compartment A formed between the first partition plate 11 and the end plate 5. The first partition plate 11 has an aperture 11a to provide communication between the first compartment A and the second compartment B. The second compartment B and the third compartment C are in communication with each other by the pipe 14 which extends through the second partition plate 12, third partition plate 13 and fourth compartment D. The third partition plate 13 has apertures 13a for providing communication between the third compartment C and the fourth compartment D. Further, the pipe 14 is provided with small apertures 14a by which the second compartment B communicates with the fourth compartment D. A tail pipe 15 extends through the third partition plate 13, inner shell 2 and outer shell 1 to provide communication between the fourth compartment D and the atmosphere.

The outer shell 1 is suspended from an engine body by two brackets 16 and 17 and welded to the bracket 18 secured to the engine body at the bent end where the exhaust pipes 8 and 9 are also welded to the bracket 18.

Each of end portions 30 (FIG. 2) of the inner shell 2 is formed in a fish shape 31 along which the inner shell is welded to each exhaust pipe. The fish mouth shape end has a thermal stress relaxation function. A U-shaped stress relaxation portion 32 is formed between the end portions 30 and serves to permit deformation of the inner shell 2 in the direction X due to thermal expansion of the exhaust pipes. Each of the end portions 30 of the inner shell 2 is welded to the exhaust pipes 8, 9 at positions which are spaced by the distance $L_1$, $L_2$ (where $L_1 = L_2$), along the exhaust pipes, from the bracket 18. Therefore, thermal expansions generated in the exhaust pipe 8 and 9 are equal in amount so that cracking and breaking of the inner shell may be satisfactorily prevented. The other end of the inner shell 2 is suspended from the car body by a resilient suspending plate 20 in a manner as will be hereinafter described.

Turning now to FIG. 1, a connecting pipe 19 is fixed to the end plate 4 at the central portion which is stiffened by a plate 21. The connecting pipe 19 is slidably disposed in the bore of the end plate 3 and projects outwardly therefrom. A plate 22 is fixed to the end of the connecting pipe 19 and secured to the suspending plate 20 which in turn is supported by the car body at the upper portion thereof thereby suspending the inner shell. A bearing 23 such as metal wool is disposed at a place near the bore of the end plate 3 and held in place by a holding plate 24 in frictional engagement with the connecting pipe 19.

In operation, exhaust gases passing through the exhaust pipes 8 and 9 are discharged through the collector 10 into the first compartment A which has a volume larger than other compartments. The speed of the exhaust gases is decreased when passing through the collector 10. Therefore, the exhaust gases remain in the first compartment A for a longer time interval. Since the exhaust pipes 8 and 9 pass through the compartments C, D and 8, the temperature of exhaust gases passing in the exhaust pipes is helped to be maintained at a high temperature by the hot gases in the compartments C, D and B. Thus, unburned constituents in the exhaust gases are effectively oxidized or re-burned in the first compartment A. The guide opening 10c serves to guide the exhaust gases toward the end wall of the inner shell 2 so that the exhaust gases are satisfactorily diffused in the compartment A.

The exhaust gases further pass through the second and third compartments B and D to the fourth compartment C and are discharged through the tail pipe 15. In this manner, the unburned constituents of the exhaust gases may be satisfactorily burned, and explosion noise may be silenced by various silencing elements provided in the inner shell 2. Since the inner shell 2 is kept at a temperature highter than the outer shell 1, the inner shell is expanded in degree greater than the outer shell 1. Accordingly, the connecting pipe 19 extends outwardly from the end plate 3 of the outer shell 1 thereby urging the suspending plate 20 leftward as viewed in FIG. 1. Accordingly, the suspending plate 20 is deflected as shown in phantom line in FIG. 1, whereby the thermal expansion of the inner shell may be absorbed.

From the foregoing it will be understood that the present invention provide a muffler in which a chamber is kept at high temperature and serves as a reactor for oxidizing or re-burning unburned constituents in engine exhaust gases and which has thermal expansion absorbing means.

What is claimed is:

1. A muffler for use in an exhaust system of an internal combustion engine for a motor vehicle, comprising an inner shell, a heat insulating layer covering said inner shell, an outer shell covering said heat insulating layer, wall means for partitioning the space in said inner shell into at least two compartments including a first compartment and a second compartment, two exhaust pipes inserted into said muffler from an end thereof, said exhaust pipes passing through said second compartment, being inserted into and opening in said first compartment so as to discharge engine exhaust gases thereinto, passage means provided in said wall means for communicating said compartments with each other, respectively, said compartments and said passage means comprising expansion chambers and communicating openings to provide noise silencing operation, and a tail pipe communicating with a last of said at least two compartments in said inner shell and having an outlet for discharging the exhaust gases into the atmosphere.

2. A muffler according to claim 1, wherein said inner shell is welded to said two exhaust pipes at an end portion of said inner shell and said inner shell includes an inner shell edge between welded portions, said edge includes a U-shaped stress relaxation portion.

3. A muffler for use in an exhaust gas system of an internal combustion engine for a motor vehicle, comprising a cylindrical inner shell having an end plate for closing one end thereof, a heat insulating layer covering said inner shell, a cylindrical outer shell covering said heat insulating layer and having an end plate for closing one end thereof, wall means for partitioning the space in said inner shell into at least two compartments including a first compartment and a second compartment, two exhaust pipes inserted into said muffler from an end thereof, said exhaust pipes passing through said second compartment, being inserted into and opening in said first compartment so as to discharge engine exhaust gases thereinto, passage means provided in said wall means for communicating said compartments with each other, respectively, said compartments and said passage means comprising expansion chambers and communicating openings to provide noise silencing operation, a tail pipe communicating with a last of said at least two compartments in said inner shell and having an outlet for discharging the exhaust gases into the atmosphere, means for securing said inner shell, outer shell and exhaust pipes with each other at the end of the outer shell, means for securing said outer shell to an engine body, a connecting member mounted on said end plate of said inner shell and projecting through the end plate of said outer shell in slidable engagement with the end plate, and a suspending member connected to said connecting member and a body of said motor vehicle so that the thermal expansion of said inner shell is permitted.

4. A muffler according to claim 3, wherein said suspending member comprises a plate for permitting the axial thermal expansion of said inner shell.

5. A muffler according to claim 3, wherein said inner shell has a pair of end plates spaced from each other, and a heat insulating layer disposed in a spacing between said pair of end plates, said connecting member being secured to one of said pair of end plates.

6. A muffler for use in an exhaust system of an internal combustion engine for a motor vehicle, comprising an inner shell, a heat insulating layer covering said inner shell, an outer shell covering said heat insulating layer, wall means for partitioning the space in said inner shell into at least two compartments including a first compartment and a second compartment, two exhaust pipes passing through said second compartment, being inserted into and opening in said first compartment so as to discharge engine exhaust gases thereinto, passage means provided in said wall means for communicating said compartments with each other, respectively, collector means mounted on ends of said exhaust pipes for regulating the discharging direction of the exhaust gases and promoting oxidation reaction of the exhaust gases, said compartments and said passage means comprising expansion chambers and communicating openings to provide noise silencing operation, and a tail pipe communicating with a last of said at least two compartments in said inner shell and having an outlet for discharging the exhaust gases into the atmosphere.

7. A muffler for use in an exhaust system of an internal combustion engine for a motor vehicle, comprising a cylindrical inner shell having an end plate for closing one end thereof, a heat insulating layer covering said inner shell, a cylindrical outer shell covering said heat insulating layer and having an end plate for closing one end thereof, wall means for partitioning the space in said inner shell into at least two compartments including a first compartment and a second compartment, two exhaust pipes inserted into said muffler from an end thereof, said exhaust pipes passing through said second compartment, being inserted into and opening in said first compartment so as to discharge engine exhaust gases thereinto, passage means provided in said wall means for communicating said compartments with each other, respectively, collector means mounted on ends of said exhaust pipes for regulating the discharging direction of the exhaust gases and promoting oxidation reaction of the exhaust gases, said compartments and said passage means comprising expansion chambers and communicating openings to provide noise silencing operation, a tail pipe communicating with a last of said at least two compartments in said inner shell and having an outlet for discharging the exhaust gases into the atmosphere, means for securing said inner shell, outer shell and exhaust pipes with each other at the end of the outer shell, means for securing said outer shell to an engine body, a connecting member mounted on said end plate of said inner shell and projecting through the end plate of said outer shell in slidable engagement with the end plate, and a suspending member connected to said connecting member and a body of said motor vehicle so that the thermal expansion of said inner shell is permitted.

8. A muffler for use in an exhaust system of an internal combustion engine for a motor vehicle, comprising an inner shell, a heat insulating layer covering said inner shell, an outer shell covering said heat insulating layer, wall means for partitioning the space in said inner shell into at least two compartments including a first compartment and a second compartment, two exhaust pipes passing through said second compartment, being inserted into and opening in said first compartment so as to discharge engine exhaust gases thereinto, passage means provided in said wall means for communicating said compartments with each other, respectively, collector means mounted on ends of said exhaust pipes for regulating the discharging direction of the exhaust gases and promoting oxidation reaction of the exhaust gases, said compartments and said passage means comprising expansion chambers and communicating openings to provide noise silencing operation, a tail pipe communicating with a last of said at least two compartments in said inner shell and having an outlet for discharging the exhaust gases into the atmosphere, a bracket means for securing said outer shell and said exhaust pipes to an engine body, said inner shell being fixed to said exhaust pipes at positions which are spaced by equal distances from said bracket means, a connecting member slidably disposed relative to said outer shell and connected to said inner shell, and a suspending member connected to said connecting member and a body of said motor vehicle so that the thermal expansion of said inner shell is permitted.

9. A muffler for use in an exhaust system of an internal combustion engine for a motor vehicle, comprising a cylindrical inner shell having an end plate for closing one end thereof, a heat insulating layer covering said inner shell, a cylindrical outer shell co-axial with said inner shell and covering said heat insulating layer and having an end plate for closing one end thereof, an exhaust pipe communicating with said inner shell for introducing engine exhaust gases thereinto, means disposed in said inner shell for silencing noises produced by the exhaust gases, a tail pipe communicating with said inner shell for discharging the exhaust gases into the atmosphere, means for securing said inner shell, outer shell and exhaust pipe to an engine body, a connecting member mounted on said end plate of said inner shell and projecting through the end plate of said outer shell in slidable engagement with the end plate, and a suspending member connected to said connecting member and a body of said motor vehicle so that the thermal expansion of said inner shell may be permitted.

10. A muffler according to claim 9, wherein said suspending member comprises a plate for permitting the axial thermal expansion of said inner shell.

11. A muffler according to claim 9, wherein said inner shell has a pair of end plates spaced from each other, and a heat insulating layer disposed in a spacing between said pair of end plates, said connecting member being secured to one of said pair of end plates.

* * * * *